Figure 1:
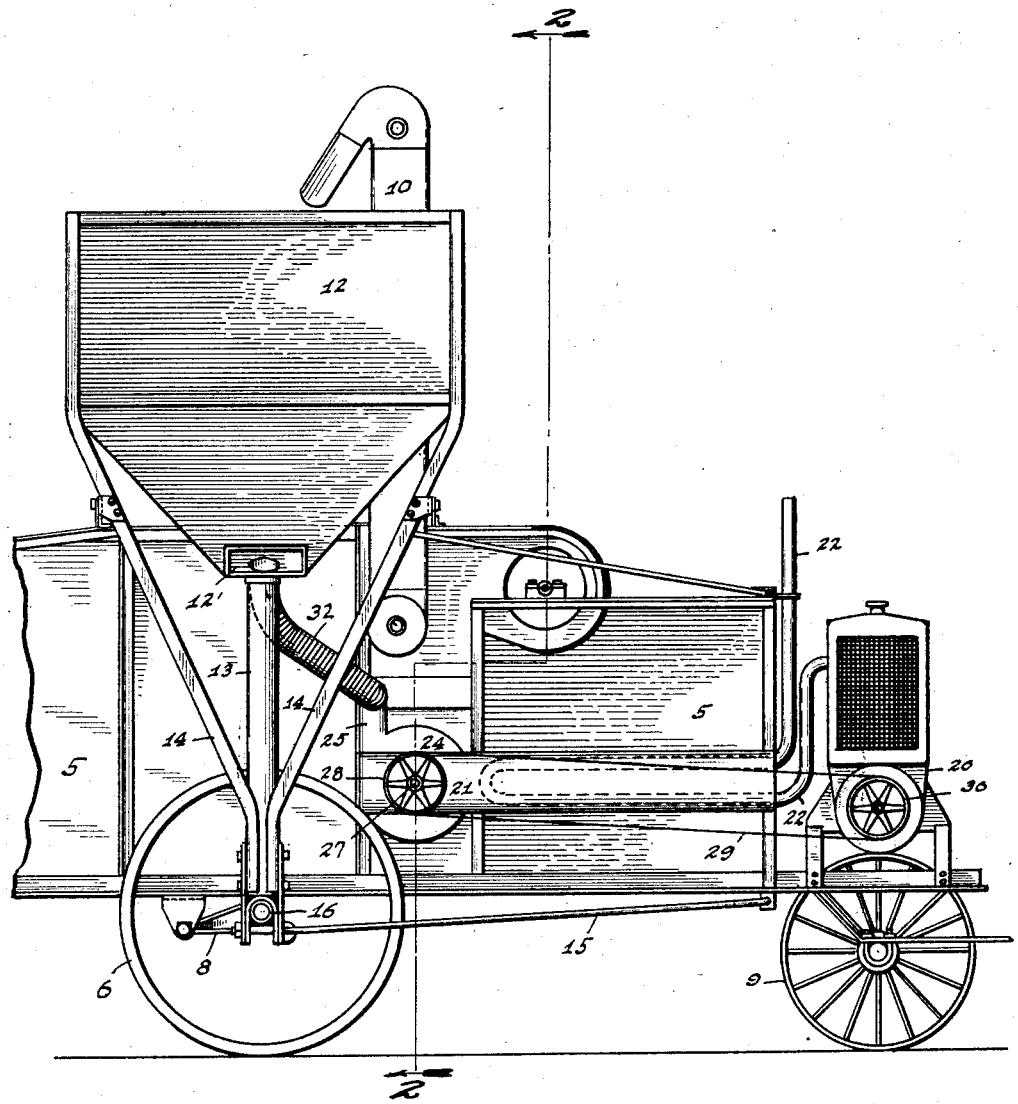

March 13, 1928.  
W. F. MacGREGOR  
1,662,431  
COMBINATION HARVESTER THRASHER  
Filed May 21, 1926  
2 Sheets-Sheet 1

Inventor  
WALLACE F. MacGREGOR,  
By James A. Walsh,  
Attorney

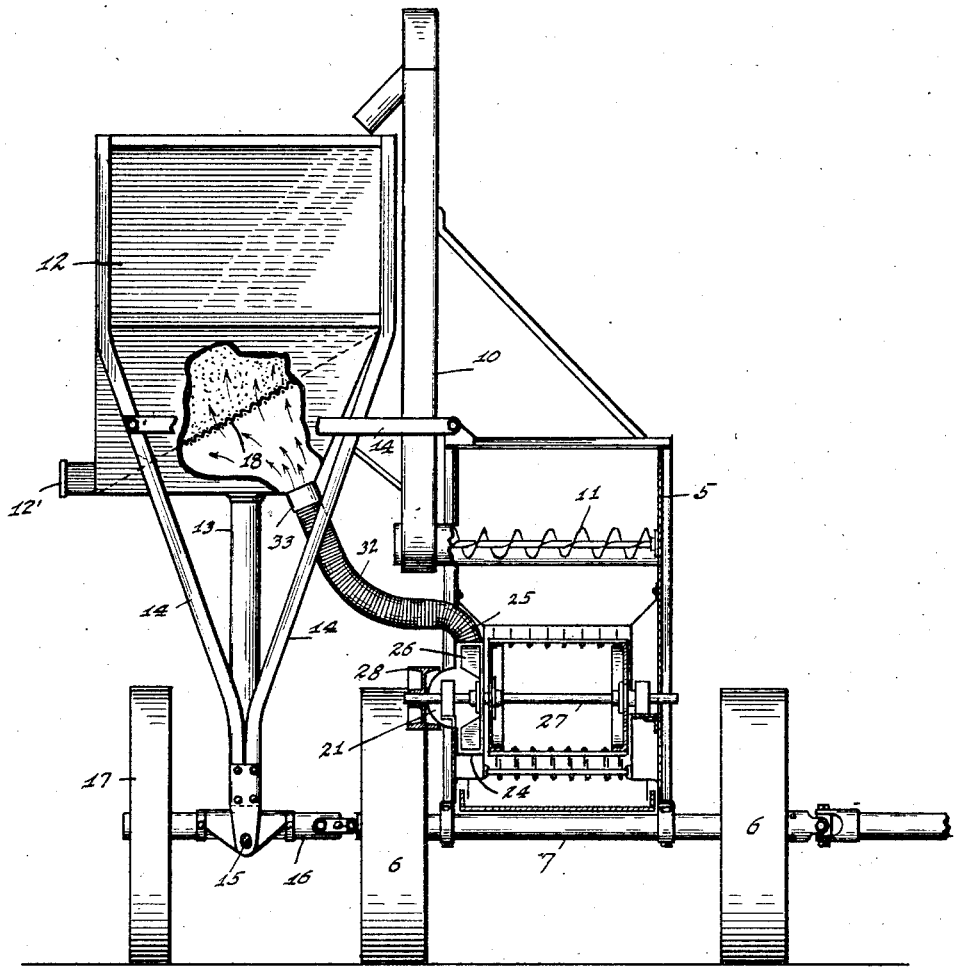

Patented Mar. 13, 1928.

1,662,431

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed May 21, 1926. Serial No. 110,627.

In cutting and thrashing grain with combination harvester-thrashers and other methods it is found that because of climatic conditions the grain kernels are in more or less damp condition, and usually so in the morning consequent to dew and fog, but as it is desirable and important to harvest the ripened crop without delay it is the common practice to begin thrashing operations at a comparatively early hour and before a drying effect has been imparted to the grain by the sun, with the result that a considerable portion of grain is harvested and stored in undried condition, which affects and injures the quality of better grain mixed therewith, so that such grain becomes a marketable loss because of low grade or unmerchantable condition.

It is the object of my invention to provide means more particularly adapted for use in connection with combination harvester-thrashers whereby grain during thrashing operations may be pneumatically treated either by warm or cold air to remove the dampness therefrom and dry the same, and which I accomplish by self-contained mechanisms of the machinery during its movement through the fields, or while the same is stationary, as will more fully appear.

In the accompanying drawings, forming part hereof, Figure 1 is a side elevation of the thrasher element of a combination harvester-thrasher embodying my improvement; and Fig. 2 is a front elevation taken on the dotted line 2—2 in Fig. 1, the axle or support for the harvester (not shown) being indicated in fragment.

In said drawings the portions marked 5 indicate a thrasher of the character which I employ, the same being supported by carrying wheels, 6, mounted on an axle, 7, by levers, 8, to permit vertical adjustment of the thrasher, and 9 is the steering wheel. The thrasher 5 is provided with an elevator, as 10, into which the thrashed grain is conveyed by an auger, 11, said elevator discharging such grain into a bin, 12, having a spout 12' for loading vehicles, and which bin is supported by suitable braces 13, 14, 15, secured to a stub-axle, 16, or otherwise in a manner to permit the vertical oscillation of the bin as the machinery travels over ground irregularities, the outer end of such stub-axle being mounted in a supplemental wheel, 17. As said parts may be of any desired construction and arrangement they will not be more specifically referred to, except to state that in a bin of my selection I provide a false bottom of reticulated or perforated material, as 18, and preferably incline the same, as indicated in Fig. 2, for facilitating discharge of the grain through the spout 12'.

In a machine of this character which carries a motor, 20, for imparting power to the thrashing and associated mechanisms I provide a chamber, 21, in which I position the exhaust pipe, 22, of the motor, in the manner illustrated or as may be appropriate to the adjacent structures, and which chamber, as will be understood, will be readily heated by the gases passing through the pipe 22. Said chamber communicates with a fan drum, 24, having a boot or outlet, 25, and in which drum I enclose a rotatable fan, 26, mounted on the usual cylinder shaft, 27, of the machine or otherwise, a pulley, 28, being mounted and rotated by a belt, 29, connected to a pulley, 30, on the motor, but any practical driving equipment for the purpose may be employed. To the boot or outlet 24 of the fan drum I connect a chute, 32, which is preferably of a flexible character, so that it may conform to the vibrations of the machinery, but I may employ any suitable construction and arrangement for the purpose, the outer end, 33, of such chute being connected to the bin 12 in any desired manner.

In operation, it will be understood that a combination harvester-thrasher is traveling through the field cutting and thrashing the grain simultaneously, such thrashed grain being conveyed by the auger 11 into the elevator 10, from which latter it is discharged into the bin 12 and supported by the perforated floor 18. While thus moving, the fan 26 is being rotated to create an air blast, which discharges through the chute 32 into the bin 12, as indicated in Fig. 2, and such discharging blast expands and passes upwardly through the mass of grain in the bin and out through the upper open end of the same. Bins for receiving grain from a thrasher described are of large capacity, some of which contain from three to four thousand pounds of grain, so that as the cutting and thrashing operation proceeds a considerable period of time is required for filling the bin, during which time the air blast from the fan is constantly discharging through and drying the grain and thus effectually conditions the same for storage. While I have particularly described the drying process during the movement of the machinery, it will be readily understood that when the machinery is stationary the grain in the bin may be subjected to a constant air blast by the mechanisms stated.

I have illustrated a thrasher of comparatively large size, equipped with a motor for operating it, and designed to be drawn by a tractor, but it is quite common to employ a thrasher without a self-contained motor, in which circumstance power from a tractor is utilized for operating the machinery and which power is imparted thereto by belt-and-pulley systems, flexible drive shafts and the like. I therefore desire it to be understood that in the latter instance I may by slight modification apply my improvement thereto in such an equivalent manner as to produce an air blast for pneumatically treating grain in a bin as stated; and although I have disclosed means for supplying heated air to the fan 26 I may when desired utilize natural air for the purpose. While I have specifically described a fan for creating a blast, it will be understood of course that I may employ a pressure blower or other suitable device for forcing air currents through the grain for the purpose stated.

I claim as my invention:

1. The combination, with a thrashing machine, of a bin for receiving thrashed grain therefrom, a fan communicating with said bin, and means associated with the thrashing machine for actuating said fan to discharge an air blast through the grain in said bin.

2. The combination, with a thrashing machine, of a bin for receiving grain therefrom, a fan, a chute leading from said fan and connected to said bin, and means associated with the thrashing machine for actuating said fan to discharge an air blast through the grain in said bin.

3. The combination, with a thrashing machine, of a bin for receiving thrashed grain therefrom, said bin having a perforated bottom, a fan, a chute leading from said fan and connected to said bin, and means associated with the thrashing machine for actuating said fan to create and discharge an air blast through said perforated bottom to dry the grain in said bin.

4. The combination, with a thrashing machine, of a vehicular bin, a fan, a chute connecting said fan and said bin, an air chamber communicating with said fan, means in said chamber for heating the air therein, and means for actuating said fan to withdraw air from said chamber and discharge the same through said chute into said bin.

5. The combination, with a thrashing machine, of a motor connected thereto, a vehicular bin supported by said machine, a fan having a chute connected to said bin, and means connecting said motor and said fan for actuating the latter to create and discharge an air blast into and through said bin.

6. The combination, with a thrashing machine, of a grain receiving bin, means associated with the thrashing machine for discharging grain from said machine into said bin, means for discharging air through said bin, and means for actuating said discharging means.

7. The combination, with a thrashing machine, of a vehicular bin, means for discharging thrashed grain from said machine into said bin, a motor having an exhaust pipe, air retaining means encasing said pipe, and means for withdrawing air from said retainer and discharging such air through said bin to dry the grain therein.

8. The combination, with a thrashing machine, of a vehicular grain receiving bin, means for discharging air through said bin, a chute connected to said discharging means and to said bin, and a motor connected to said discharging means for actuating the latter to discharge air currents through said bin.

9. The combination, with a thrashing machine, of a vehicular bin for receiving grain thrashed by the machine while moving through the fields, means communicating with said bin for supplying air to the grain therein, means for actuating said air supplying means, and means for preheating the air conveyed by said air supplying means.

10. In a machine of the class described, a thrasher, means for discharging thrashed grain therefrom, an elevator into which said grain is delivered, a portable bin adjacent said thrasher and connected thereto for receiving said thrashed grain from said elevator, means associated with said bin for permitting the discharge of grain therefrom, a fan associated with said thrasher, means for actuating said fan to create an air blast, and means communicating with said fan and said bin for conveying air to the latter and discharging such air through the grain in said bin.

In testimony whereof I affix my signature.

WALLACE F. MacGREGOR.